(12) United States Patent
Imura

(10) Patent No.: US 6,185,435 B1
(45) Date of Patent: Feb. 6, 2001

(54) RADIO COMMUNICATION APPARATUS FOR COMMUNICATING WITH A PLURALITY OF DIFFERENT COMMUNICATION SYSTEMS

(75) Inventor: Minoru Imura, Tokyo (JP)

(73) Assignee: NEC Corporation, Tokyo (JP)

( * ) Notice: Under 35 U.S.C. 154(b), the term of this patent shall be extended for 0 days.

(21) Appl. No.: 08/978,058

(22) Filed: Nov. 25, 1997

(30) Foreign Application Priority Data

Nov. 29, 1996 (JP) .................................................. 8-319972

(51) Int. Cl.[7] ................................ H04B 1/38; H04B 1/06
(52) U.S. Cl. ........................ 455/552; 455/277.1; 455/426
(58) Field of Search ................................... 455/67.1, 103, 455/132, 133, 134, 135, 272, 277.1, 277.2, 422, 403, 423, 425, 426, 432, 434, 436, 437, 440, 442, 443, 444, 446, 450, 462, 465, 517, 524, 525, 550, 552, 553, 509, 512, 513; 375/227, 346, 285

(56) References Cited

U.S. PATENT DOCUMENTS

| | | | | |
|---|---|---|---|---|
| 5,263,079 | * | 11/1993 | Umemoto ............................. | 455/553 |
| 5,309,502 | * | 5/1994 | Hirai ..................................... | 455/552 |
| 5,442,680 | * | 8/1995 | Schellinger et al. ................ | 455/522 |
| 5,533,099 | * | 7/1996 | Byrne ................................... | 455/552 |
| 5,561,673 | * | 10/1996 | Takai et al. ........................ | 455/277.3 |
| 5,574,973 | | 11/1996 | Borth et al. . | |
| 5,613,205 | * | 3/1997 | Dufour ................................. | 455/440 |
| 5,640,684 | * | 6/1997 | Konosu et al. ...................... | 455/67.3 |

FOREIGN PATENT DOCUMENTS

| | | | |
|---|---|---|---|
| 0 452 290 | | 10/1991 | (EP) . |
| 0 660 626 A2 | * | 6/1995 | (EP) . |
| 0 660 626 | | 6/1995 | (EP) . |
| 0 762 791 | | 3/1997 | (EP) . |
| 6-292258 | | 10/1994 | (JP) . |
| 7-177570 | | 7/1995 | (JP) . |
| 7-221684 | | 8/1995 | (JP) . |
| 7-327253 | | 12/1995 | (JP) . |
| WO 97/30562 | | 8/1997 | (WO) . |

* cited by examiner

Primary Examiner—Nay Maung
(74) Attorney, Agent, or Firm—Young & Thompson

(57) ABSTRACT

A radio communication apparatus which can cope with a plurality of different communication systems automatically selects a communication system exhibiting good communication channel quality from the plurality of communication systems, thereby performing communication. Communication channel qualities are compared with each other on the basis of at least one of a reception signal electric field strength, a reception data quality signal, and a reception data error rate which are received from each radio base station, or upon assigning priorities thereto, thereby determining a communication system.

12 Claims, 3 Drawing Sheets

RADIO COMMUNICATION APPARATUS FOR COMMUNICATING WITH A PLURALITY OF DIFFERENT COMMUNICATION SYSTEMS

BACKGROUND OF THE INVENTION

1. Field of the Invention

The present invention relates to a radio communication apparatus and, more particularly, to a mobile or portable radio communication apparatus which has a communication function capable of coping with a plurality of different communication systems.

2. Description of the Prior Art

Conventional portable telephones in a personal handy phone system (PHS) and a cellular system can perform communication only within the respective systems but cannot perform communication between different systems.

In each of these PHS and cellular systems, a plurality of radio base stations form communication zones, and a portable telephone communicates with a radio base station which forms the communication zone in which the portable telephone is present. The communication zones partially overlap each other. A portable telephone located at such an overlapping portion receives signals from a plurality of radio base stations, and can transmit signals to a plurality of radio base stations.

In such a case, to select one of the radio base stations, the portable telephone measures the electric field strengths or bit error rates of signals from the respective radio base stations and communicates with a radio base station exhibiting good radio channel quality.

For example, such radio communication apparatuses designed to select a radio base station in one communication system on the basis of the radio channel quality are disclosed in Japanese Unexamined Patent Publication Nos. 7-327253 and 6-292258.

Radio communication apparatuses capable of performing communication through a plurality of communication systems have recently been proposed. Such a radio communication apparatus must select a specific communication system through which communication is to be performed. For example, Japanese Unexamined Patent Publication No. 7-177570 discloses a radio telephone apparatus capable of performing communication through two communication systems based on the cellular mode and the PHP (Personal Handy Phone) mode. In a communication system selection method for this apparatus, to determine the presence/absence of the radio telephone apparatus in the service area of a PHP communication system in the initial stage of communication, the apparatus checks whether a signal from a PHP base station is received or not. More specifically, if the radio telephone apparatus has received a radio wave from the PHP base station, the radio telephone apparatus determines that the apparatus is present in the service area of the PHP communication system, and performs communication through the PHP communication system. If the radio telephone apparatus cannot receive a radio wave from the PHP base station, the apparatus determines that it is not present in the service area of the PHP communication system, and communication through the other communication system based on the cellular mode is executed. The possibility of communication through the PHP communication system is determined preferentially in this manner because the communication cost in the PHP communication system is lower than that in the other system, and the service area is small.

As described above, the radio telephone apparatus disclosed in Japanese Unexamined Patent Publication No. 7-177570 can automatically perform an originating operation to one of the systems by determining whether the apparatus is present in the service area of the PHP communication system, in consideration of the communication cost. Since this determination is performed by checking whether the apparatus is present in the service area of the PHP communication system, the PHP communication system is selected regardless of channel quality if the apparatus is present in the service area of the PHP communication system.

After a communication system is selected, a radio base station may be selected on the basis of radio channel quality, as described in Japanese Unexamined Patent Publication Nos. 7-327253 and 6-292258.

Assume that the channel quality provided by the cellular communication system is better than that provided by the PHP communication system at the time of channel connection. Even in this case, if the apparatus is present in an area where it can communicate through the PHP communication system, the PHP communication system, in which the communication cost is low, is automatically selected. Even if, therefore, a radio base station exhibiting good channel quality in the system is selected on the basis of the electric field strength or the like after a communication system is selected, this does not so improve the overall channel quality.

SUMMARY OF THE INVENTION

The present invention has been made in consideration of the above problems, and has as its object to provide a radio communication apparatus which can cope with a plurality of communication systems, and can select a communication system exhibiting a good communication state at the time of channel connection. It is another object of the present invention to provide a selecting means for optimally selecting a communication system exhibiting a good communication state at the time of channel connection in a radio communication apparatus which can cope with a plurality of communication systems.

In order to achieve the above object, according to the present invention, there is provided a radio communication apparatus which can cope with a plurality of different communication systems, comprising a plurality of radio communication means for performing communications through the plurality of different communication systems, and selecting means for selecting one of the plurality of radio communication means, wherein the selecting means selects one of the plurality of radio communication means on the basis of communication channel qualities in the plurality of radio communication means.

With the above arrangement, the radio communication apparatus of the present invention can select a communication system exhibiting the optimal communication line quality from a plurality of different communication systems, with which the apparatus can cope, in any environment, thereby realizing a comfortable standby state or communication state.

In the above radio communication apparatus, communication channel quality is preferably determined on the basis of at least one of a reception signal electric field strength, a reception data quality signal, and a reception data error rate which are received from each radio base station. In addition, communication channel quality is preferably determined by comparing reception signal electric field strengths, reception data quality signals, and reception data error rates in the plurality of radio communication means, after priorities are assigned thereto.

In this case, a reception data quality signal is preferably a signal indicating the difference between an analog value to be converted, and an expected value in A/D-converting the IF signal, obtained by frequency-converting a reception signal into a reception data string.

Each of the plurality of different communication systems is preferably at least one of a personal handy phone system (PHS), a cellular telephone system, a cordless telephone system, a car telephone system, a two-way pager system, and a radio data communication system.

DETAILED DESCRIPTION OF THE INVENTION

The present invention will be described in detail below with reference to the accompanying drawings.

Figure 1:
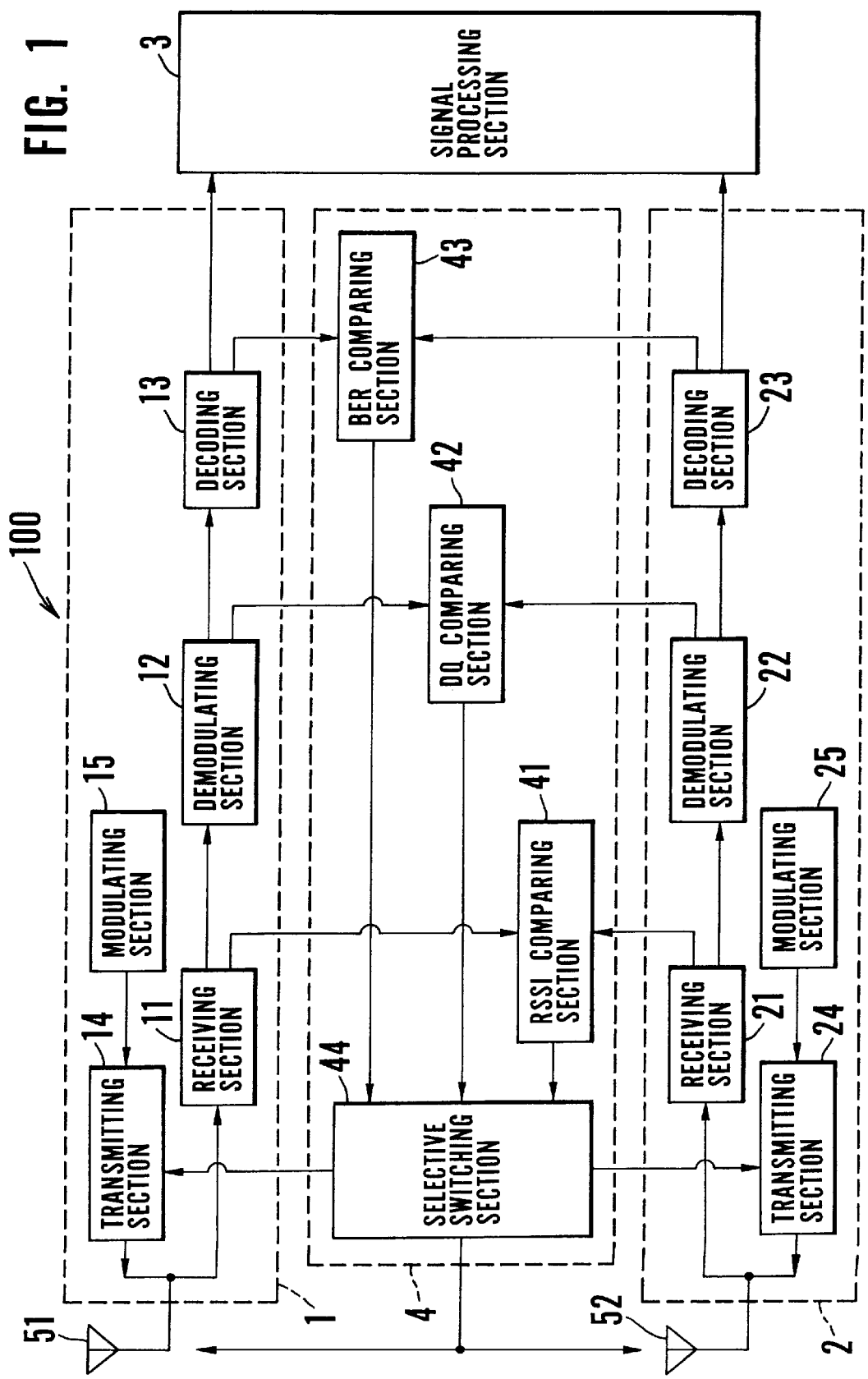
FIG. 1 is a block diagram showing the arrangement of a radio communication apparatus according to a preferred embodiment of the present invention.

The arrangement of a radio communication apparatus of the present invention will be described first with reference to FIG. 1. FIG. 1 is a block diagram showing the arrangement of a radio communication apparatus according to a preferred embodiment of the present invention.

As shown in FIG. 1, a radio communication apparatus 100 includes a first radio section 1, a second radio section 2, a signal processing section 3, a selection control section 4, an antenna 51, and an antenna 52.

The first and second radio sections 1 and 2 respectively correspond to different communication systems. For example, each radio section preferably corresponds to one of the following systems: a personal handy phone system (PHS), a cellular telephone system, a cordless telephone system, a car telephone system, a two-way pager system, and a radio data communication system. Assume that the first and second radio sections 1 and 2 respectively correspond to the PHS and the cellular telephone system in the following description. The first and second radio sections 1 and 2 will therefore be referred to as the PHS radio section 1 and the cellular radio section 2, respectively.

Each block will be described in more detail next with reference to FIG. 1.

The PHS radio section 1 includes a receiving section 11, a demodulating section 12, a decoding section 13, a transmitting section 14, and a modulating section 15. The PHS radio section 1 communicates with a PHS base station (not shown) through the antenna 51. The modulating section 15 modulates a transmission signal which is input thereto to be transmitted to a PHS base station. The transmitting section 14 transmits the signal modulated by the modulating section 15 to the PHS base station through the antenna 51. The receiving section 11 receives a signal from a PHS base station through the antenna 51, and performs frequency conversion of the signal to convert it into an IF signal. In addition, the receiving section 11 measures a reception electric field strength (RSSI). The demodulating section 12 demodulates the IF signal to output a reception data string as the demodulated signal, and measures a reception data quality signal (DQ). The decoding section 13 decodes the signal demodulated by the demodulating section 12, and measures a reception data bit error rate (BER) from the reception data string as the demodulated signal.

Similarly, the cellular radio section 2 includes a receiving section 21, a demodulating section 22, a decoding section 23, a transmitting section 24, and a modulating section 25. The cellular radio section 2 communicates with a cellular base station (not shown) through the antenna 52. The modulating section 25 modulates a transmission signal which is input thereto to be transmitted to a cellular base station. The transmitting section 24 transmits the signal, modulated by the modulating section 25, to the cellular base station through the antenna 52. The receiving section 21 receives a signal from a cellular base station through the antenna 52, and performs frequency conversion of the signal to convert it into an IF signal. In addition, the receiving section 21 measures a reception electric field strength (RSSI). The demodulating section 22 demodulates the IF signal to output a reception data string as the demodulated signal, and measures a reception data quality signal (DQ). The decoding section 23 decodes the signal demodulated by the demodulating section 22, and measures a reception data BER from the reception data string as the demodulated signal.

The signal processing section 3 performs various types of signal processing for the decoded signals output from the decoding section 13 and the decoding section 23. Since the operation of the signal processing section 3 is irrelevant to the gist of the present invention, a detailed description thereof will be omitted.

The selection control section 4 includes an RSSI comparing section 41, a DQ comparing section 42, a BER comparing section 43, and a selective switching section 44. The RSSI comparing section 41 receives and compares the reception electric field strengths of signals from a PHS base station and a cellular base station, i.e., the RSSIs measured by the receiving sections 11 and 21. The DQ comparing section 42 receives and compares the DQs measured by the receiving sections 12 and 22. The BER comparing section 43 receives and compares the BERs measured by the decoding sections 13 and 23. The selective switching section 44 receives the comparison results from the RSSI comparing section 41, the DQ comparing section 42, and the BER comparing section 43, and performs switching between the transmitting sections 14 and 24 and the antennas 51 and 52 in accordance with the comparison results. When switching between the transmitting sections and the antennas is to be performed, it is preferable that one transmitting section and one antenna be turned on, and the other transmitting section and the other antenna be turned off. In this manner, a communication system which exhibits a good communication state or good channel quality is selected by the selection control section 4, and communication is performed by using the selected radio section.

When a communication system is selected by the selective switching section, switching may be performed between the receiving sections as well as the transmitting sections.

In the radio communication apparatus 100 in FIG. 1, the radio sections and the antennas are provided for the respective radio communication systems. If, however, a radio section and an antenna can be commonly used for the respective radio communication systems, radio sections and the antennas need not be independently provided for the respective systems. If, for example, these parts can be commonly used by changing only the frequency or power level of an oscillation circuit, the variables for them may be changed in accordance with a selected communication system.

The selective switching section 44 switches one transmitting section and one antenna. If, however, a transmission signal is supplied to only one radio section by supplying it to one modulating section, the transmitting sections and the antennas need not always be switched.

Figure 2:
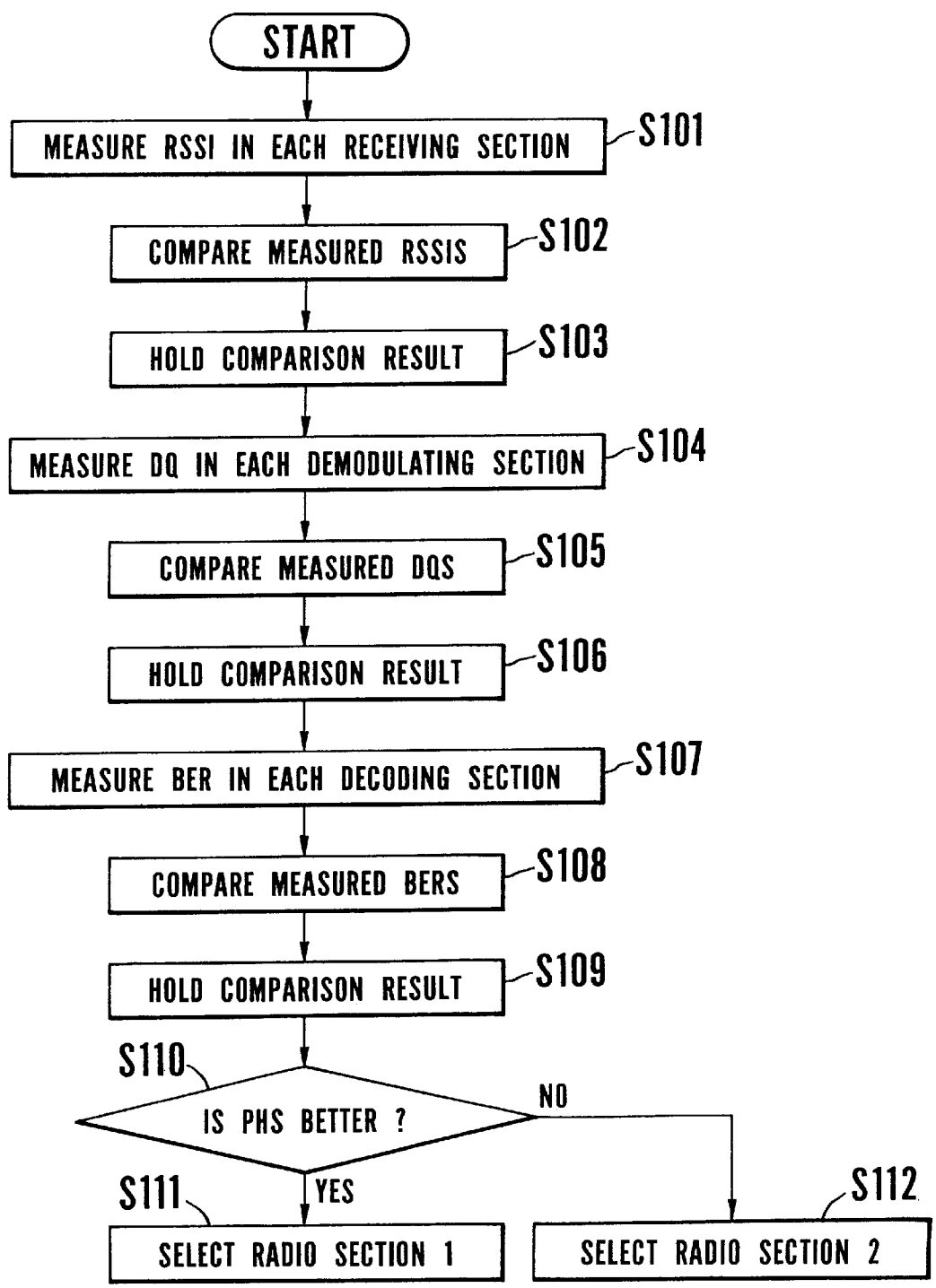
FIG. 2 is a flow chart for explaining the operation of the radio communication apparatus in FIG. 1.

The operation of the radio communication apparatus 100 in FIG. 1 will be described next with reference to the flow chart of FIG. 2.

First of all, the receiving sections 11 and 21 measure the RSSIs of signals from a PHS base station and a cellular base station (step S101). This measurement may be performed by the two receiving sections at the same or different times. The measured RSSIs are compared with each other by the RSSI comparing section 41 (step S102). For example, the comparison result is held in a storage section in the selective switching section 44 (step S103).

The demodulating sections 12 and 22 measure the DQs of reception data strings (step S104). The measured DQs are compared with each other by the DQ comparing section 42 (step S105). The comparison result is held in the storage section in the selective switching section 44 (step S106).

A DQ (reception data quality signal) indicates the precision/difference between an analog value to be converted and an expected value in A/D-converting an IF signal into a reception data string. The analog value to be converted corresponds to the parameter representing a data signal according to the modulation scheme, e.g., an amplitude, a phase, or a frequency.

Similarly, the decoding sections 13 and 23 measure BERs (step S107). The measured BERs are compared with each other by the BER comparing section 43 (step S108). The comparison result is held in the storage section in the selective switching section 44 (step S109).

The RSSI, DQ, and BER comparison results are determined by the selective switching section 44 (step S110) to select a communication system exhibiting good channel quality (step S112). More specifically, if radio waves from the PHS base station provide better channel quality than radio waves from the cellular base station, the PHS radio section 1 is selected to communicate through the PHS system. In contrast to this, if it is determined that radio waves from the cellular base station provide better channel quality than radio waves from the PHS base station, the cellular radio section 2 is selected to communicate through the cellular communication system.

Note that comparison result determination may be performed using all RSSIs, DQs, and BERS, as will be described later, or may be performed on the basis of any one type of information. If determination is to be performed by using only one type of information, comparison results need not be necessarily stored, and other types of information need not be compared.

The RSSI, DQ,. and BER comparison results are preferably weighted to assign priorities to the respective comparison results, and the respective communication systems are compared with each other on the basis of the RSSI, DQ, and BER comparison results, thereby selecting a communication system determined as the best system. In this case, higher priorities are preferably assigned to the DQ, BER, and RSSI comparison results in the order named. For example, DQs are compared with each other first to select a better system. If the DQs are equal to each other, BERS are compared with each other next to select a better system. If the BERs are equal to each other, RSSIs are compared with each other to select a better system. The probability that the three types of data are equal to each other is very low, therefore weighted priorities can be assigned to these data.

Alternatively, the RSSIs measured by the receiving sections 11 and 21 may be compared with a predetermined reference level. In this case, if the RSSI from one radio section is higher than the reference level, while the RSSI from the other radio section is lower than the reference level, the communication system corresponding to the RSSI higher than the reference level is selected. If both the RSSIs are higher than the reference level, DQs or BERs are compared with each other to select a system exhibiting better quality.

Note that the above RSSI, DQ, and BER comparison results need not necessarily held in the selective switching section 44. These data may be stored in a memory outside the selective switching section 44. Instead of the RSSI, DQ, and BER comparison results, the respective RSSIS, DQs, and BERs themselves may be stored.

As described above, communication system selection is performed by selecting a communication system determined as a system exhibiting good channel quality on the basis of at least one of measured RSSI, DQ, and BER data. In this case, the power supply for the transmitting section and antenna of the communication system which is not selected may be turned off. Alternatively, signals may be transmitted/received through the selected radio section while the power supply for the communication system which is not selected is kept on.

The above communication system selecting operation may be performed when the power supply for the radio communication apparatus is turned on, or when an originating operation is performed.

In the above embodiment, the radio communication apparatus can cope with the two communication systems. However, the present invention is not limited to the two communication systems, and can be applied to a radio communication apparatus which can cope with a plurality of different communication systems.

Figure 3:
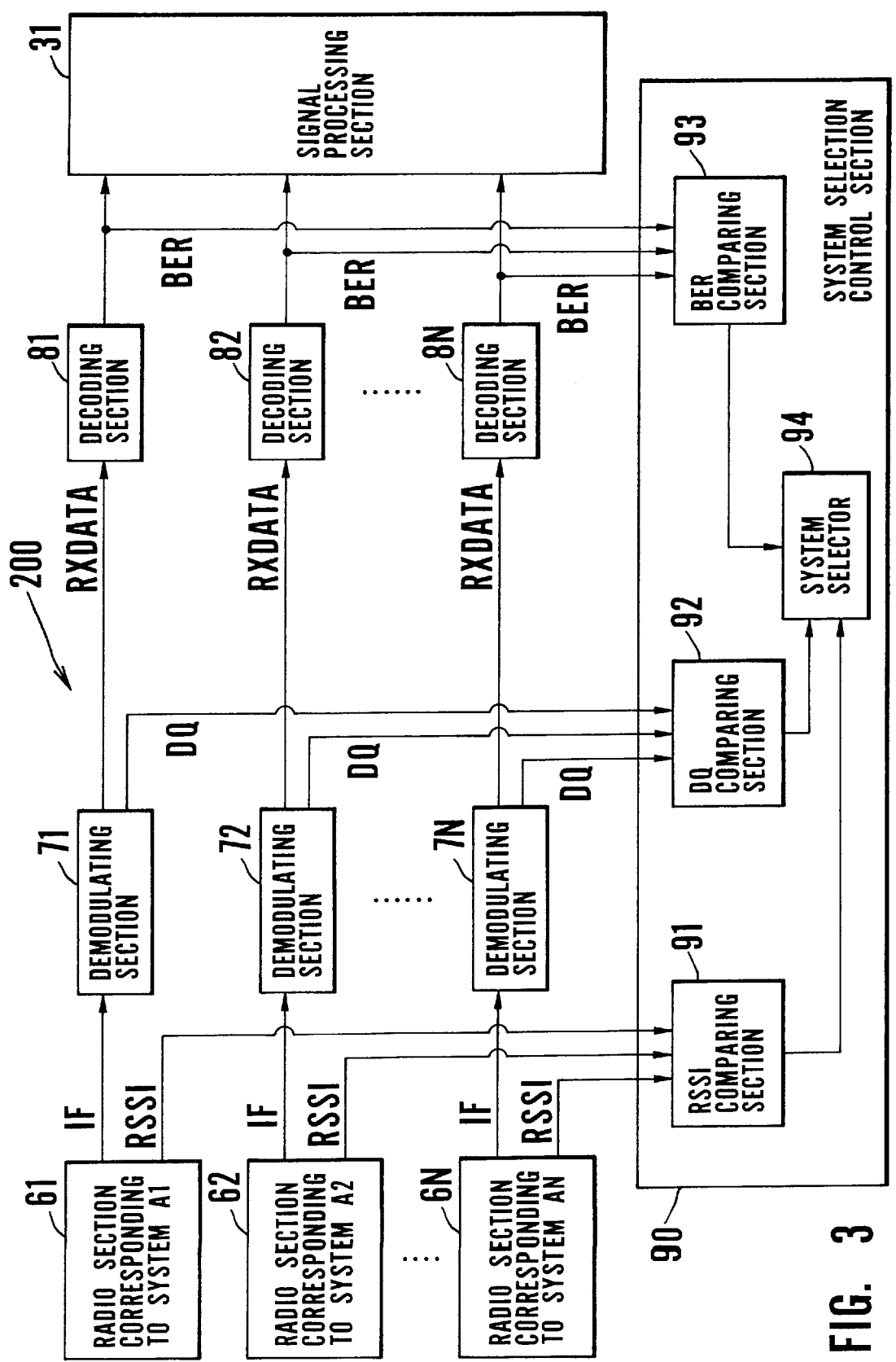
FIG. 3 is a block diagram showing the arrangement of a radio communication apparatus according to another embodiment of the present invention.

An embodiment in which the present invention is applied to a radio communication apparatus which can cope with a plurality of different communication systems will be described below with reference to FIG. 3. FIG. 3 is a block diagram showing the arrangement of a radio communication apparatus which can cope with a plurality of communication systems.

As shown in FIG. 3, a radio communication apparatus 200 includes radio sections 61 to 6N, demodulating sections 71 to 7N, decoding sections 81 to 8N, a signal processing section 31, and a system selection control section 90. The sections 61 to 6N, 71 to 7N, and 81 to 8N respectively correspond to N communication systems A1 to AN. The radio section 61, the demodulating section 71, and the decoding section 81 correspond to the first communication system A1. The radio section 62, the demodulating section 72, and the decoding section 82 correspond to the second communication system A2. Similarly, the radio section 6N, the demodulating section 7N, and the decoding section 8N correspond to the Nth communication system AN. The signal processing section 31 and the system selection control section 90 are commonly used for the respective communication systems.

The radio section 61 corresponding to the first communication system A1 receives a signal from a first communication system base station through an antenna (not shown), and performs frequency conversion to convert it into an IF signal. In addition, the radio section 61 measures the RSSI of the reception signal. The demodulating section 71 demodulates the IF signal to output a reception data string as the demodulated signal, and measures the DQ of the signal. The decoding section 81 decodes the demodulated signal, and measures a BER from the reception data string.

The communication configurations corresponding to the second to Nth communication systems A2 to AN operate in the same manner as described above.

The system selection control section 90 is constituted by an RSSI comparing section 91 for comparing the RSSIs of signals received from the respective communication system base stations, a DQ comparing section 92 for comparing the DQs from the respective demodulating sections, a BER comparing section 93 for comparing the BERs from the respective decoding sections, and a system selector 94 for selecting any one of the communication systems.

FIG. 3 shows only the reception system. Since the transmission system is the same as that shown in FIG. 1, an illustration and description thereof are omitted.

In the above embodiment, a communication state is detected by using RSSI, DQ, and BER data. However, this detection may be performed by using one of these data. In this case, the comparing sections for data which are not used are not required. A communication state detection method other than those described above may be used as long as channel quality can be detected.

What is claimed is:

1. A radio communication apparatus which can cope with a plurality of different communication systems, comprising:
   a plurality of radio communication means for performing communications through the plurality of different communication systems, said plurality of radio communication means at least comprising a personal handy phone system (PHS) and at least one other radio communication means; and
   selecting means for selecting one of said plurality of radio communication means,
   wherein said selecting means selects one of said plurality of radio communication means on the basis of communication channel qualities in said plurality of radio communication means, said selecting means determining the communication channel qualities through a priority-sequenced evaluation of a plurality of different signal parameters,
   said selecting means comprising a comparing means for comparing a first of said plurality of different signal parameters for each of said plurality of radio communication means to a first reference level,
   wherein when the first of said plurality of different signal parameters for at least two of said plurality of radio communication means is greater than the first reference level, said comparing means further compares a second of said plurality of different signal parameters for said at least two of said plurality of radio communication means to a second reference level.

2. An apparatus according to claim 1, wherein said comparing means for comparing the communication channel qualities, compares each of said plurality of different signal parameters to a respective minimum value.

3. An apparatus according to claim 1, wherein said comparing means compares reception signal electric field strengths in said plurality of radio communication means.

4. An apparatus according to claim 1, wherein said comparing means compares reception data quality signals in said plurality of radio communication means.

5. An apparatus according to claim 1, wherein said comparing means compares reception data error rates in said plurality of radio communication means.

6. An apparatus according to claim 1, wherein the plurality of different signal parameters comprise reception signal electric field strengths, reception data quality signals, and reception data error rates.

7. An apparatus according to claim 1, wherein said at least one other radio communication means is at least one of a cellular telephone system, a cordless telephone system, a car telephone system, a two-way pager system, and a radio data communication system.

8. A radio communication apparatus which can cope with a plurality of different communication systems, comprising:
   a plurality of receiving means for receiving signals from base stations in the plurality of different communication systems, said plurality of receiving means comprising a personal handy phone system (PHS);
   a plurality of demodulating means for demodulating the signals received by said receiving means;
   a plurality of decoding means for decoding the signals demodulated by said demodulating means;
   means for comparing channel qualities in the plurality of communication systems on the basis of output signals from said receiving means, said demodulating means, and said decoding means,
   said comparing means determining a comparison result by one of
   a first comparison of a first channel quality signal of each of said plurality of communication systems to a first reference value, followed by at least a second comparison of a second channel quality signal to a second reference value for each of the communication systems of those of said plurality of communication systems having respective first channel quality signals greater than the first reference value, and
   a comparison of the first channel quality signal of each of said plurality of communication systems to each other to determine a single communication system having a largest value, wherein when at least two of said plurality of communication systems have the largest value, an further comparison of the second channel quality signal of each of said at least two of said plurality of communication systems; and
   selecting means for selecting a communication system exhibiting good channel quality from the plurality of different communication systems on the basis of the comparison result from said comparing means.

9. A radio communication apparatus which can cope with a plurality of different communication systems, comprising:
   a plurality of radio communication means for performing communications through the plurality of different communication systems, said plurality of radio communication means comprising at least two of a personal handy phone system, a cellular telephone system, a cordless telephone system, a car telephone system, a two-way pager system, and a radio data communication system; and
   selecting means for selecting one of said plurality of radio communication means, said selecting means selecting one of said plurality of radio communication means on the basis of the communication channel qualities in said plurality of radio communication means,
   said selecting means comprising a comparison section for comparing the communication channel qualities of said plurality of radio communication means and determining a first, second, and third comparison result based on an evaluation of a respective first, second, and third quality parameter, said selecting means for selecting a preferred one of said plurality of radio communication means on the basis of at least one of the first, second, and third comparison results obtained by said comparison section, said comparison section comprising i) a reception signal electric field strength comparing section arranged to compare reception signal electric field strengths from each of said plurality of radio communication means, ii) a reception data quality signal comparing section arranged to compare reception data quality signals from each of said plurality of radio communication means, and iii) a reception data error rate comparing section arranged to compare reception data error rates from each of said plurality of radio communication means, said selecting means selecting the preferred one of said plurality of radio communication means based on the first comparison result, wherein when at least two of said plurality of radio communication means have an equal first quality value, said selecting means uses the second comparison result to select the preferred one of said plurality of radio communication means and when at least two of said plurality of radio communication means have an equal second quality value, said selecting means uses the comparison result to select the preferred one of said plurality of radio communication means.

10. The radio communication apparatus of claim 9, wherein said selecting means further comprises weighting means for assigning relative priorities to each of said reception signal electric field strength comparing section, said reception data quality signal comparing section, and said reception data error rate comparing section.

11. The radio communication device of claim 9, wherein said reception data quality signal comparing section comprises an input connected to an output of a demodulation section of each of said plurality of radio communication means, each said input accepting a reception data quality signal from an associated one of said demodulation sections, the reception data quality signal indicating the difference between an analog value to be converted and an expected value in an analog to digital conversion of an intermediate frequency into a reception data string by said associated one of said demodulation sections.

12. The radio communication device of claim 11, wherein the analog value to be converted is one of an amplitude, a phase, and a frequency parameter representing a data signal according to a modulation scheme associated with the data signal.

* * * * *